(12) United States Patent
Yokoyama et al.

(10) Patent No.: US 8,971,631 B2
(45) Date of Patent: Mar. 3, 2015

(54) DATA PROCESSING SYSTEM, DATA PROCESSING METHOD, AND STORAGE MEDIUM

(75) Inventors: Sachie Yokoyama, Ome (JP); Rumiko Hashiba, Kawasaki (JP); Hideki Tsutsui, Tachikawa (JP); Chikashi Sugiura, Hamura (JP); Toshihiro Fujibayashi, Hino (JP); Takashi Sudo, Fuchu (JP); Takehiko Isaka, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 237 days.

(21) Appl. No.: 13/601,921

(22) Filed: Aug. 31, 2012

(65) Prior Publication Data

US 2013/0301922 A1    Nov. 14, 2013

(30) Foreign Application Priority Data

May 11, 2012   (JP) .................. 2012-109830

(51) Int. Cl.
*G06K 9/62*    (2006.01)

(52) U.S. Cl.
USPC .......................................... 382/187

(58) Field of Classification Search
None
See application file for complete search history.

(56) References Cited

U.S. PATENT DOCUMENTS

| | | | |
|---|---|---|---|
| 2007/0064036 A1* | 3/2007 | Hasuike | 347/16 |
| 2007/0154116 A1* | 7/2007 | Shieh | 382/314 |
| 2010/0125787 A1* | 5/2010 | Chihara et al. | 715/702 |
| 2011/0190053 A1* | 8/2011 | Kawamoto et al. | 463/31 |
| 2012/0114244 A1* | 5/2012 | Fujiwara | 382/186 |

FOREIGN PATENT DOCUMENTS

| | | |
|---|---|---|
| JP | 2007-028634 | 1/1995 |
| JP | 2001-273313 | 10/2001 |
| JP | 2005-025550 A | 1/2005 |
| JP | 2006-031492 A | 2/2006 |
| JP | 2006-092370 | 4/2006 |
| JP | 2011-003016 A | 1/2011 |

OTHER PUBLICATIONS

User interface for Data Entry with a Pen Device. Toyakawa, K. 1994. Retrieved from IP.com.*
First Office Action mailed by Japan Patent Office on Jan. 22, 2013 in the corresponding Japanese Patent Application No. 2012-109830.
Final Office Action mailed by Japan Patent Office on Jun. 11, 2013 in the corresponding Japanese Patent Application No. 2012-109830.

* cited by examiner

*Primary Examiner* — Stephen R Koziol
*Assistant Examiner* — Delomia Gilliard
(74) *Attorney, Agent, or Firm* — Knobbe, Martens, Olson & Bear LLP

(57) ABSTRACT

According to one embodiment, a data processing system includes a touchscreen display, a recorder, and a processor. The recorder is configured to record a plurality of stroke data indicating loci handwritten on the touchscreen display and times respectively. The processor is configured to execute data processing using a first time indicated by first stroke data associated with first data and a second time indicated by second stroke data associated with second data.

21 Claims, 9 Drawing Sheets

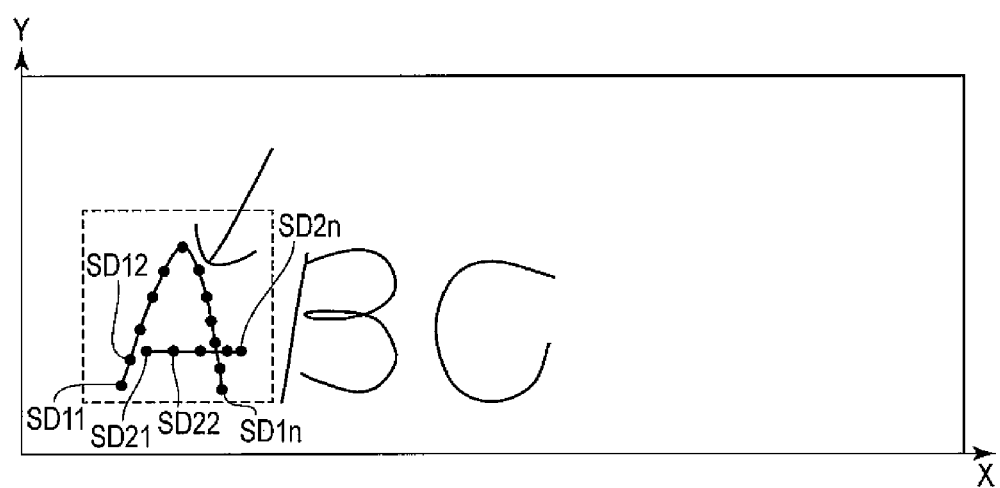
F I G. 3

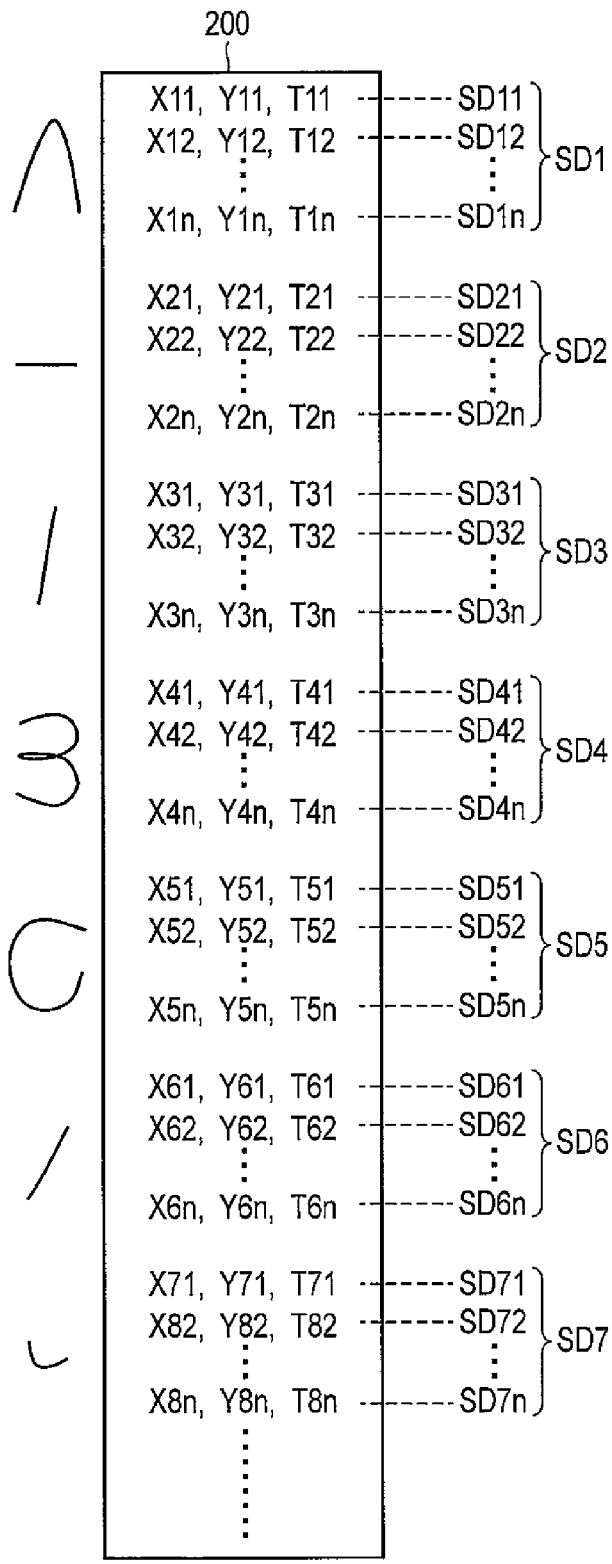
F I G. 4

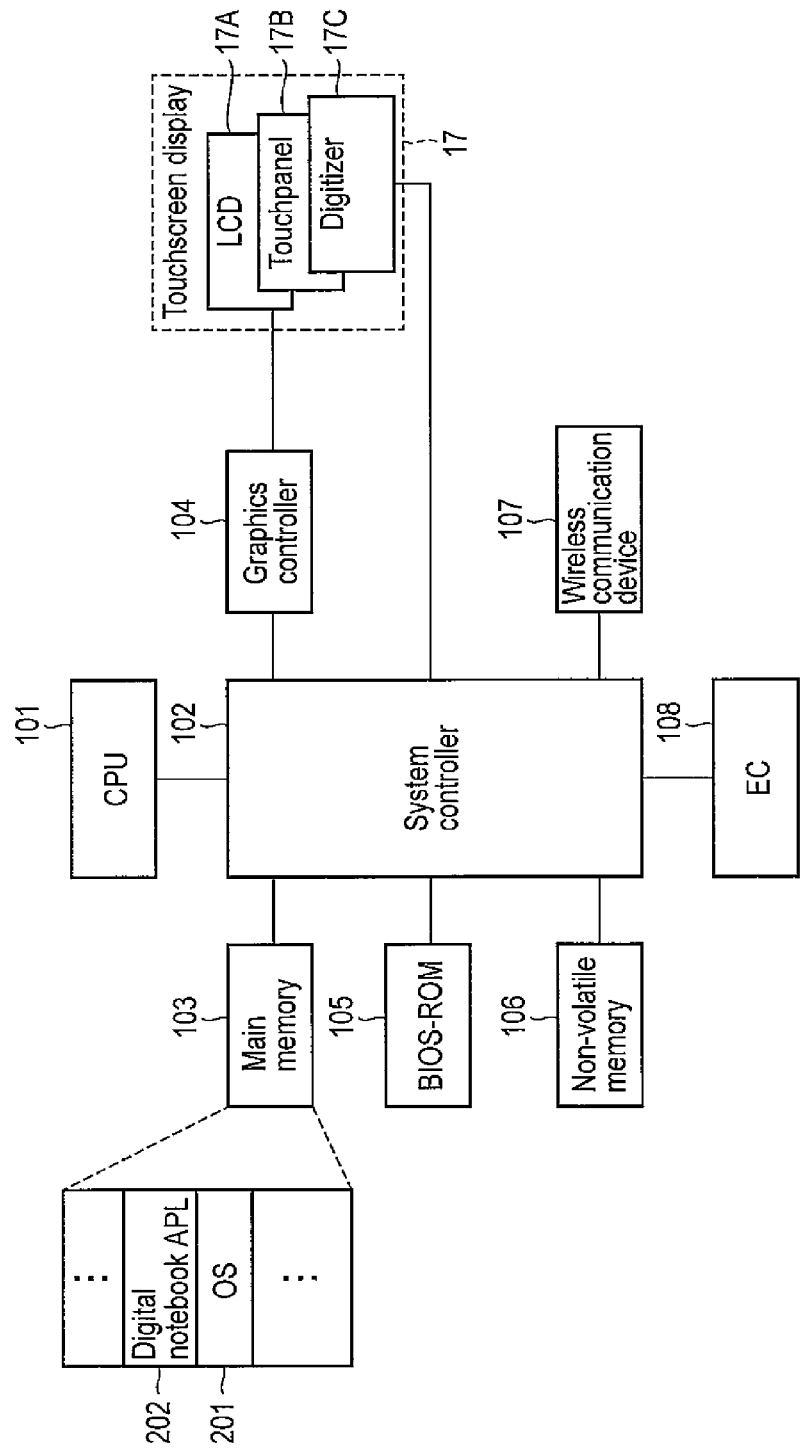
F I G. 5

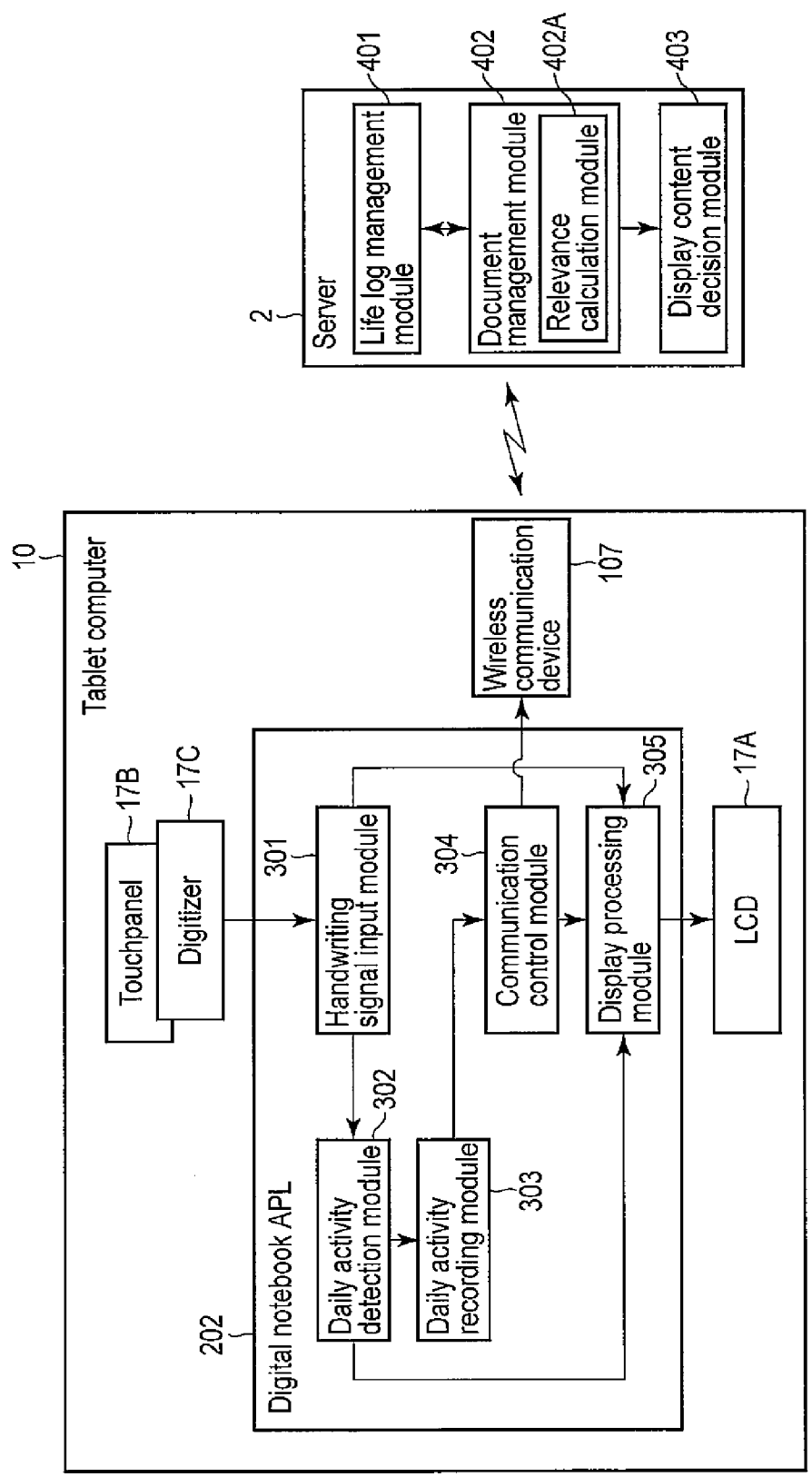
F I G. 6

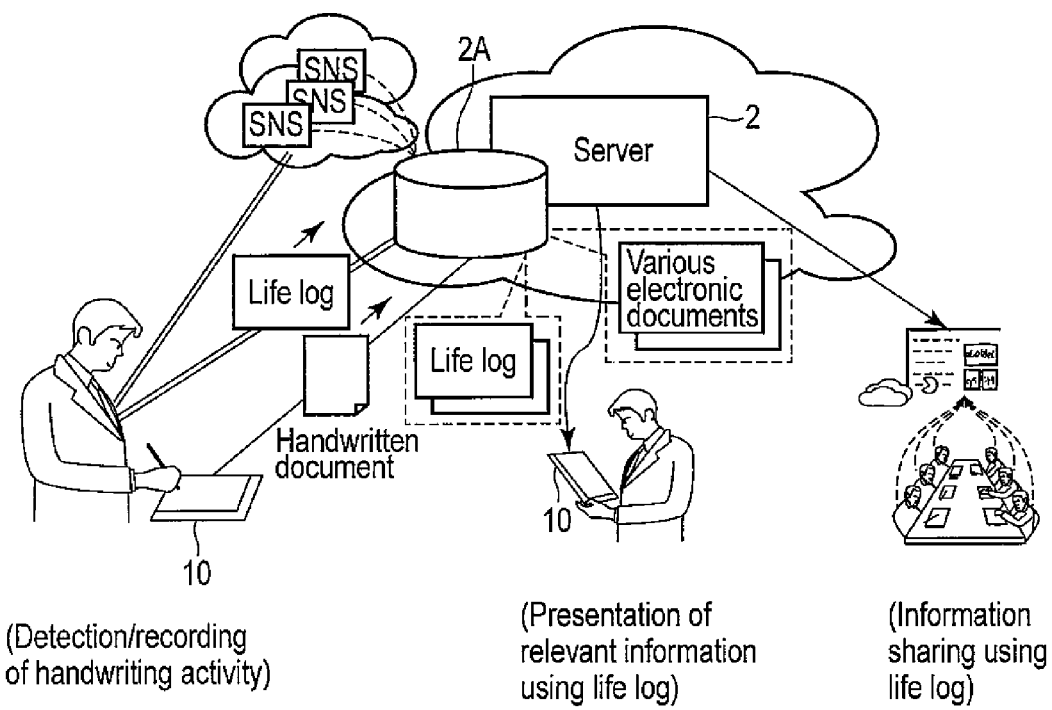
F I G. 7

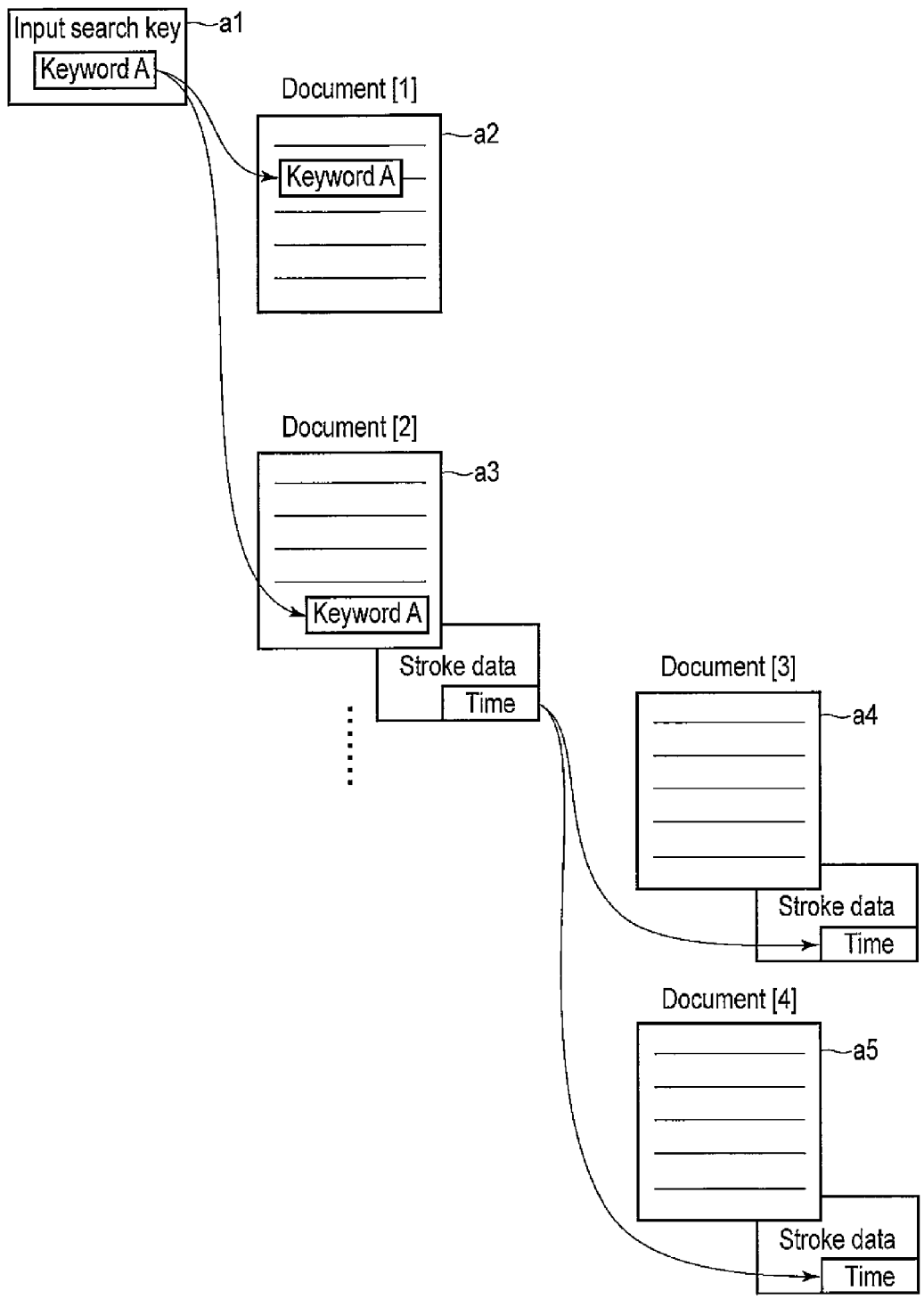
F I G. 8

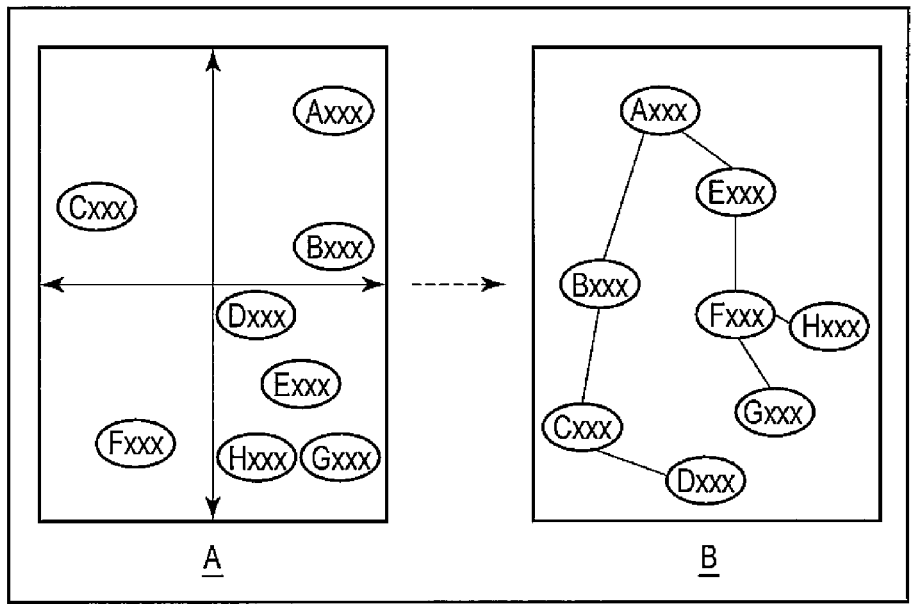
F I G. 9
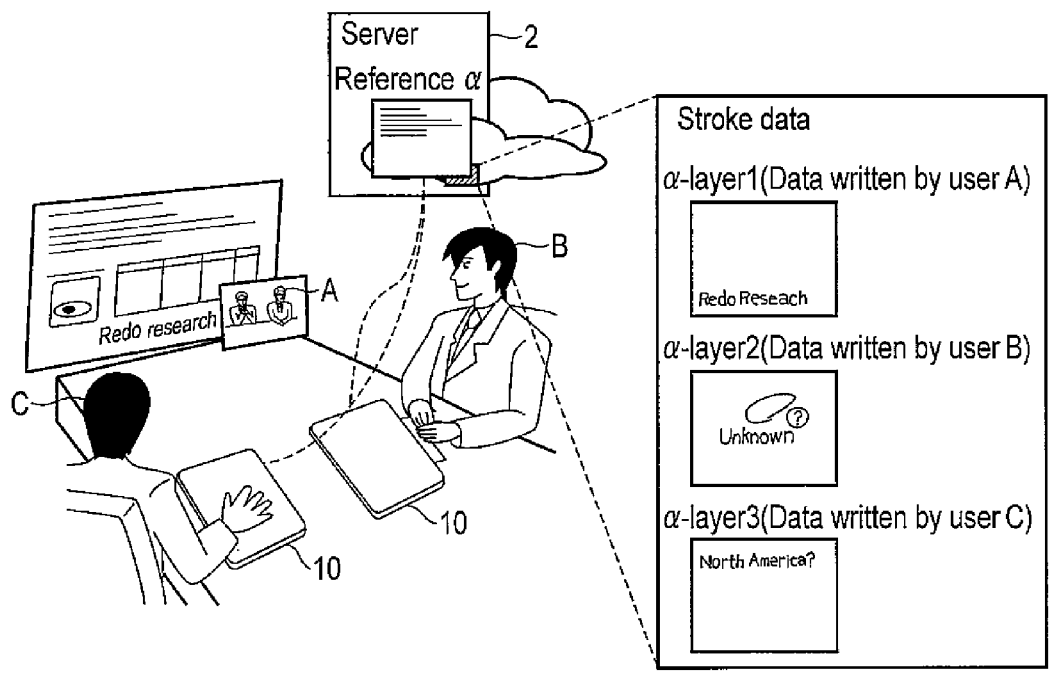
F I G. 10

US 8,971,631 B2

DATA PROCESSING SYSTEM, DATA PROCESSING METHOD, AND STORAGE MEDIUM

CROSS-REFERENCE TO RELATED APPLICATIONS

This application is based upon and claims the benefit of priority from Japanese Patent Application No. 2012-109830, filed May 11, 2012, the entire contents of which are incorporated herein by reference.

FIELD

Embodiments described herein relate generally to a handwritten data processing technique in a data processing system.

BACKGROUND

In recent years, various types of electronic apparatuses such as a tablet terminal, PDA, and smart phone have been developed. Most of such electronic apparatuses include a touchscreen display for facilitating a user input operation.

The user can instruct the electronic apparatus to execute a function associated with a menu or object displayed on the touchscreen display by touching the menu or object with a finger or the like.

In recent years, some users bring this type of electronic apparatus to attend a meeting, and take notes by performing a handwriting input operation on the touchscreen display. Various kinds of user support that assume a business scene, such as a system for supporting a meeting, have been proposed.

Data acquired when the user performs a handwriting input operation on the touchscreen display of this type of electronic apparatus are limited to image data which are accumulated for viewing, or converted into text data using OCR software. That is, a handwriting input activity has not been acquired as data to be used for user support.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary view showing an example of a handwritten document which is handwritten on the touchscreen display of the electronic apparatus applied to the data processing system according to the embodiment.

FIG. 4 is an exemplary view for explaining time-series information corresponding to the handwritten document shown in FIG. 3, which is acquired in the data processing system according to the embodiment.

FIG. 5 is an exemplary block diagram showing the system configuration of the electronic apparatus applied to the data processing system according to the embodiment.

FIG. 6 is an exemplary block diagram showing the functional configuration of the data processing system according to the embodiment.

FIG. 7 is an exemplary schematic view showing a use case of the data processing system according to the embodiment.

FIG. 8 is an exemplary view for explaining presentation of relevant information using a life log, which is achieved by the data processing system according to the embodiment.

FIG. 9 is an exemplary view for explaining idea generation support using the life log, which is achieved by the data processing system according to the embodiment.

FIG. 10 is an exemplary first view for explaining information sharing using the life log, which is achieved by the data processing system according to the embodiment.

DETAILED DESCRIPTION

Various embodiments will be described hereinafter with reference to the accompanying drawings.

In general, according to one embodiment, a data processing system includes a touchscreen display, a recorder, and a processor. The recorder is configured to record a plurality of stroke data indicating loci handwritten on the touchscreen display and times respectively. The processor is configured to execute data processing using a first time indicated by first stroke data associated with first data and a second time indicated by second stroke data associated with second data.

Figure 1:
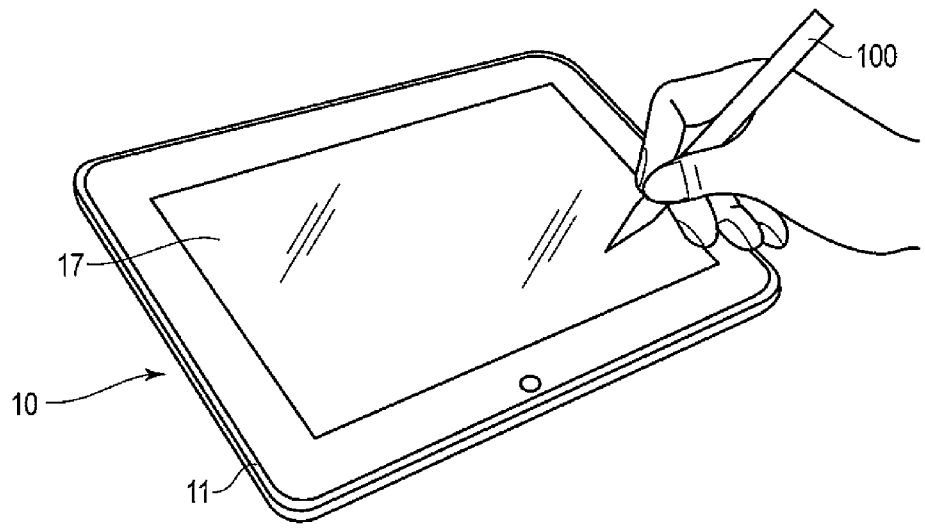
FIG. 1 is an exemplary perspective view showing the appearance of an electronic apparatus (tablet computer) applied to a data processing system according to an embodiment.

FIG. 1 is an exemplary perspective view showing the appearance of an electronic apparatus applied to a data processing system according to the embodiment. The electronic apparatus is, for example, a pen-based portable electronic apparatus which enables a handwriting input operation with a pen or finger. The electronic apparatus can be implemented as a tablet computer, a notebook personal computer, a smart phone, a PDA, or the like. Assume that the electronic apparatus is implemented as a tablet computer 10. The tablet computer 10 is a portable electronic apparatus also called a tablet or straight computer, which includes a main body 11 and a touchscreen display 17, as shown in FIG. 1. The touchscreen display 17 is attached on the upper surface of the main body 11.

The main body 11 has a thin, box-shaped housing. The touchscreen display 17 incorporates a flat panel display, and a sensor configured to detect the touch position of a pen or finger on the screen of the flat panel display. The flat panel display may be, for example, a liquid crystal display (LCD). A static-capacitance-type touchpanel, an electromagnetic-induction-type digitizer, or the like can be used as the sensor. Assume that the touchscreen display 17 incorporates two types of sensors, that is, a digitizer and a touchpanel.

Each of the digitizer and touchpanel is provided to cover the screen of the flat panel display. The touchscreen display 17 can detect a touch operation on the screen using a pen 100 in addition to a touch operation on the screen using a finger. The pen 100 may be, for example, an electromagnetic-induction-type pen. The user can perform a handwriting input operation on the touchscreen display 17 using an external object (the pen 100 or finger). The locus of the external object (the pen 100 or finger), that is, the locus (handwritten mark) of each stroke handwritten by a handwriting input operation is displayed on the screen. The locus of the external object while it touches the screen corresponds to one stroke. A set of a number of strokes corresponding to a handwritten character or graphic, that is, a set of a number of loci (handwritten marks) forms a handwritten document.

In this embodiment, this handwritten document is saved in a storage medium as time-series information indicating the sequence of coordinates of the locus of each stroke and the order relationship between the strokes, instead of image data. Although the time-series information will be described in detail later with reference to FIG. 4, it generally means a set of time-series stroke data respectively corresponding to a plurality of strokes. Each stroke data corresponds to a given stroke, and represents the time-series coordinates of the stroke. The order of the stroke data corresponds to the writing order of the handwritten character or graphic.

The tablet computer 10 can read out arbitrary existing time-series information from the storage medium, and display, on the screen, handwritten document corresponding to the readout time-series information, that is, the locus corresponding to each of a plurality of strokes indicated by the time-series information. Furthermore, the tablet computer 10 includes an edit function. The edit function can erase or move the locus of an arbitrary stroke within the displayed handwritten document in accordance with an edit operation by the user using an eraser tool, a range designation tool, other various tools, and the like. Furthermore, the edit function enables to cancel the history of some handwriting operations.

In this embodiment, the time-series information (handwritten document) can be managed as one or a plurality of pages. In this case, the time-series information (handwritten document) may be divided into areas each of which can be displayed on one screen, and some of the time-series information which can be displayed on one screen may be recorded as one page. Alternatively, the page size may be variable. In this case, since it is possible to increase the page size to an area larger than the size of one screen, a handwritten document corresponding to an area larger than the size of the screen can be processed as one page. If it is impossible to display one page as a whole on the display at once, the page may be reduced, or a display target portion within the page may be moved by scrolling the page vertically or horizontally.

Figure 2:
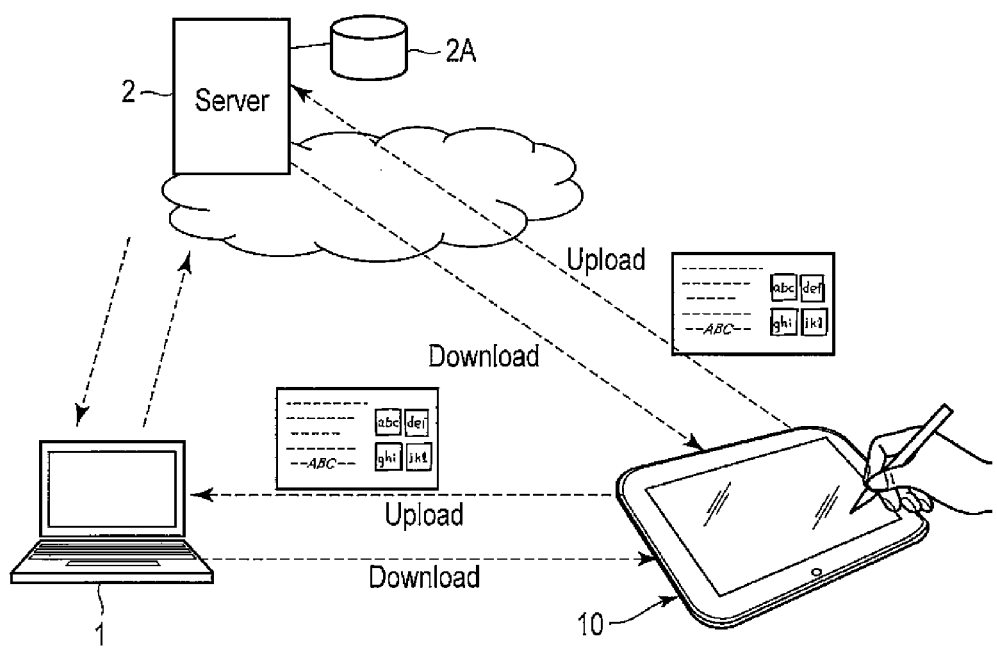
FIG. 2 is an exemplary view showing a cooperative operation between an external apparatus (a personal computer or server) and the electronic apparatus within the data processing system according to the embodiment.

FIG. 2 shows an example of a cooperative operation between an external apparatus (a personal computer or server) and the tablet computer 10 within the data processing system according to the embodiment. The tablet computer 10 can cooperate with a personal computer 1 and a cloud. That is, the tablet computer 10 includes a wireless communication device such as a wireless LAN, and can execute wireless communication with the personal computer 1. Furthermore, the tablet computer 10 can also communicate with a server 2 on the Internet. The server 2 may execute an online storage service, and other various cloud computing services.

The personal computer 1 includes a storage device such as a hard disk drive (HDD). The tablet computer 10 can transmit time-series information (a handwritten document) to the personal computer 1 through a network, thereby recording (uploading) the information in the HDD of the personal computer 1. To ensure secure communication between the tablet computer 10 and the personal computer 1, the personal computer 1 may authenticate the tablet computer 10 upon start of communication. In this case, a dialog box for prompting the user to input an ID or password may be displayed on the screen of the tablet computer 10, or the tablet computer 10 may automatically transmit its ID to the personal computer 1.

This allows the tablet computer 10 to process a number of pieces of time-series information (a number of handwritten documents) or a large amount of time-series information (a large handwritten document) even if the capacity of the storage within the tablet computer 10 is small.

Furthermore, the tablet computer 10 can read out (download) an arbitrary one or more pieces of time-series information recorded in the HDD of the personal computer 1, and display, on the screen of the display 17 of the tablet computer 10, the locus of each stroke indicated by the readout time-series information. In this case, a list of thumbnails obtained by reducing the page of each of a plurality of pieces of time-series information (a plurality of handwritten documents) may be displayed, or one page selected from the thumbnails may be displayed on the display 17 in a normal size.

Furthermore, the tablet computer 10 may communicate with the server 2, instead of the personal computer 1, on the cloud which provides a storage service and the like, as described above. The tablet computer 10 can transmit time-series information (a handwritten document) through the network, thereby recording (uploading) the information in a storage device 2A of the server 2. Furthermore, the tablet computer 10 can read out (download) arbitrary time-series information recorded in the storage device 2A of the server 2, and display, on the screen of the display 17 of the tablet computer 10, the locus of each stroke indicated by the readout time-series information.

As described above, in this embodiment, the storage medium in which the time-series information is stored may be any of the storage device of the tablet computer 10, that of the personal computer 1, and that of the server 2.

The relationship between time-series information and strokes (characters, marks, graphics, tables, or the like) handwritten by the user will be described with reference to FIG. 3 and FIG. 4. FIG. 3 shows an example of a handwritten document (handwritten character string) handwritten on the touchscreen display 17 using the pen 100 or the like.

In the handwritten document, a further character or graphic is often handwritten on a handwritten character or graphic. In FIG. 3, a handwritten character string "ABC" has been handwritten in the order of "A", "B", and "C", and thereafter, a handwritten arrow has been handwritten immediately adjacent to the handwritten character "A".

The handwritten character "A" is represented by two strokes (a locus with a shape "∧" and that with a shape "-") handwritten using the pen 100 or the like, that is, two loci. The locus with the shape "∧" of the pen 100, which has been handwritten first, is sampled at regular intervals in real time, thereby generating time-series coordinates SD11, SD12, ..., SD1n of the stroke with the shape "∧". Similarly, the locus with the shape "-" of the pen 100, which has been handwritten next, is also sampled, thereby generating time-series coordinates SD21, SD22, ..., SD2n of the stroke with the shape "-".

The handwritten character "B" is represented by two strokes which have been handwritten using the pen 100 or the like, that is, two loci. The handwritten character "C" is represented by one stroke which has been handwritten using the pen 100 or the like, that is, one locus. The handwritten arrow is represented by two strokes which have been handwritten using the pen 100 or the like, that is, two loci.

FIG. 4 shows time-series information 200 corresponding to the handwritten document shown in FIG. 3. The time-series information contains a plurality of stroke data SD1, SD2, ..., SD7. In the time-series information 200, stroke data SD1, SD2, ..., SD7 are arranged, in time-series, in the order of the handwritten marks, that is, in the order in which the plurality of strokes were handwritten.

In the time-series information 200, the first two stroke data SD1 and SD2 respectively indicate the two strokes forming the handwritten character "A". The third and fourth stroke data SD3 and SD4 respectively indicate the two strokes forming the handwritten character "B". The fifth stroke data SD5 indicates the one stroke forming the handwritten character "C". The sixth and seventh stroke data SD6 and SD7 respectively indicate the two strokes forming the handwritten arrow.

Each stroke data indicates time-series coordinates corresponding to one stroke, that is, a plurality of sets of coordinates corresponding to one stroke. In each stroke data, a plurality of sets of coordinates are arranged in the writing order of the stroke in time-series. For example, for the handwritten character "A", stroke data SD1 contains the time-series coordinates of the stroke with the shape "∧" of the handwritten character "A", that is, the n coordinate data SD11, SD12, . . . , SD1n. Stroke data SD2 indicates the time-series coordinates of the shape "-" of the handwritten character "A", that is, the n coordinate data SD21, SD22, . . . , SD2n. Note that the number of coordinate data may be different for each stroke data.

Each coordinate data indicates an X-coordinate and a Y-coordinate corresponding to one point of a corresponding locus. For example, the coordinate data SD11 indicates an X-coordinate (X11) and a Y-coordinate (Y11) corresponding to the start point of the stroke with the shape "∧". The data SD1n indicates an X-coordinate (X1n) and a Y-coordinate (Y1n) corresponding to the end point of the stroke with the shape "∧".

Each coordinate data contains timestamp information T. The timestamp information T indicates a time when a corresponding point was handwritten. The time of the handwriting operation may be an absolute time (for example, year/month/day/hour/minute/second) or a relative time with reference to a given time point. For example, an absolute time (for example, year/month/day/hour/minute/second) when writing of a corresponding stroke starts may be added to each stroke data, and a relative time indicating a difference with respect to the absolute time may be added, as the timestamp information T, to each coordinate data within the stroked data.

Furthermore, information (Z) indicating a writing pressure may be added to each coordinate data.

The time-series information 200 having the structure described with reference to FIG. 4 can represent the writing order in which the character or graphic was handwritten, in addition to the handwritten mark of each stroke. Using the time-series information 200, therefore, allows to process the handwritten character "A" and the point of the handwritten arrow as different characters or graphics even if the point of the handwritten arrow has been written on or adjacent to the handwritten character "A", as shown in FIG. 3.

Assume that the user designates a given range on the screen, as indicated by a rectangle with broken lines in FIG. 3. The designated range represented by the rectangle with the broken lines includes the two strokes of the handwritten character "A" and the one stroke corresponding to the point of the handwritten arrow. In general, not only the two strokes of the handwritten character "A" but also the one stroke corresponding to the point of the handwritten arrow may be selected as part of time-series information to be processed.

In this embodiment, however, using the time-series information 200, it is possible to exclude the point of the handwritten arrow from the part of the time-series information to be processed. That is, in this embodiment, the time-series information 200 is analyzed to determine that the two strokes (stroke data SD1 and SD2) of the handwritten character "A" have been sequentially handwritten. It is also determined that the timing of handwriting the point (stroke data SD7) of the handwritten arrow is not continuous with the timing of handwriting the two strokes of the handwritten character "A". It is, therefore, possible to exclude the point (stroke data SD7) of the handwritten arrow from the part of time-series information to be processed.

In the time-series information 200 of this embodiment, as described above, the arrangement of stroke data SD1, SD2, . . . , SD7 indicates the writing order of the handwritten characters. For example, the arrangement of stroke data SD1 and SD2 represents that the stroke with the shape "∧" was handwritten first and then, the stroke with the shape "-" was handwritten. Even if, therefore, the handwritten marks of two handwritten characters are similar to each other, it is possible to distinguish the two handwritten characters as different characters when the writing orders of the two handwritten characters are different from each other.

Furthermore, in this embodiment, since the handwritten document is stored not as an image or a character recognition result but as the time-series information 200 including a set of time-series stroke data as described above, it is possible to process handwritten characters irrespective of the language of the handwritten characters. The structure of the time-series information 200 of this embodiment can be commonly used in various countries in the world where different languages are used.

FIG. 5 is an exemplary block diagram showing the system configuration of the tablet computer 10.

As shown in FIG. 5, the tablet computer 10 includes a CPU 101, a system controller 102, a main memory 103, a graphics controller 104, a BIOS-ROM 105, a non-volatile memory 106, a wireless communication device 107, and an embedded controller (EC) 108.

The CPU 101 is a processor for controlling the operations of various modules within the tablet computer 10. The CPU 101 executes various software programs loaded from the non-volatile memory 106 as a storage device into the main memory 103. The software programs include an operating system (OS) 201 and various application programs. The application programs include a digital notebook application program 202. The digital notebook application program 202 includes a function of creating and displaying the above-described handwritten document, a function of editing the handwritten document, a handwritten mark search function, a character/graphic recognition function, and the like.

The CPU 101 also executes a Basic Input/Output System (BIOS) stored in the BIOS-ROM 105. The BIOS is a program for hardware control.

The system controller 102 is a device which connects the local bus of the CPU 101 with various components. The system controller 102 also incorporates a memory controller for making access control of the main memory 103. The system controller 102 also includes a function of communicating with the graphics controller 104 via a serial bus complying with the PCI Express standard, or the like.

The graphics controller 104 is a display controller for controlling an LCD 17A used as the display monitor of the tablet computer 10. A display signal generated by the graphics controller 104 is sent to the LCD 17A. The LCD 17A displays a screen image based on the display signal. A touchpanel 17B and a digitizer 17C are arranged on the LCD 17A. The touchpanel 17B is a static-capacitance-type pointing device used to input data on the screen of the LCD 17A. The touchpanel 17B detects a touch position where a finger touches the screen, a change in the touch position, and the like. The digitizer 17C is an electromagnetic-induction-type pointing device used to input data on the screen of the LCD 17A. The digitizer 17C detects a touch position where the pen 100 touches the screen, a change in the touch position, and the like.

The wireless communication device 107 is configured to execute wireless communication such as wireless LAN communication or 3G mobile communication. The EC 108 is a one-chip microcomputer which includes an embedded controller for power management. The EC 108 includes a function of powering on/off the tablet computer 10 according to the operation of a power button by the user.

FIG. 6 is an exemplary block diagram showing the functional configuration of the data processing system of the embodiment.

As described above with reference to FIG. 2, the tablet computer 10 can operate in cooperation with the personal computer 1 and the server 2. The data processing system of the embodiment is implemented by the cooperative operation between the tablet computer 10 and the server 2, and includes a handwriting signal input module 301, a daily activity detection module 302, a daily activity recording module 303, a communication control module 304, and a display processing module 305 which are provided in the tablet computer 10 (included in the digital notebook application program 202), and a life log management module 401, a document management module 402, and a display content decision module 403 which are provided in the server 2.

Note that although the arrangement example in which the life log management module 401, document management module 402, and display content decision module 403 are provided in the server 2 is shown here, it is also possible to provide the life log management module 401, document management module 402, and display content decision module 403 in the tablet computer 10, that is, it is also possible to construct the data processing system on a stand alone tablet computer 10.

As described above, the touchscreen display 17 causes the touchpanel 17B or digitizer 17C to detect a touch operation on the screen. The handwriting signal input module 301 inputs a detection signal output from the touchpanel 17B or digitizer 17C. The detection signal input by the handwriting signal input module 301 is supplied to the display processing module 305. Based on the detection signal, the display processing module 305 immediately displays the locus (handwritten mark) of each handwritten stroke on the LCD 17A of the touchscreen display 17.

The detection signal input by the handwriting signal input module 301 is also supplied to the daily activity detection module 302. Based on the detection signal, the daily activity detection module 302 detects a user handwriting input activity to generate data. In addition to detection of a user handwriting input activity using a signal from the handwriting signal input module 301, the daily activity detection module 302 detects various daily activities of the user to generate data using, for example, a signal from an acceleration sensor or GPS (neither of which is shown in FIG. 5). Information associated with various daily activities of the user including a handwriting input activity which has been detected to generate data by the daily activity detection module 302 will be referred to as a life log.

The life log generated by the daily activity detection module 302 is supplied to the daily activity recording module 303. The daily activity recording module 303 causes the wireless communication device 107 to transmit the life log to the server 2 via the communication control module 304. The communication control module 304 is a module for driving of the wireless communication device 107 to transmit/receive data to/from the external apparatus (the personal computer 1 or server 2). For a handwriting activity, a plurality of attributes such as an attribute indicating a document for which the handwriting activity has been performed are given as time-series stroke data as described above, and are managed by the life log management module 401 of the server 2 in association with other daily activities of the user.

The document management module 402 of the server 2 manages documents, which include a plurality of document types such as the business references, of one or a plurality of users. The document management module 402 includes a relevance calculation module 402A. The relevance calculation module 402A is a module for calculating the relevance between documents by applying an existing method. To calculate the relevance, it is possible to use the life log managed by the life log management module 401.

If, for example, the daily activity detection module 302 detects an information viewing activity of the user, it notifies the display processing module 305 of the activity. The display processing module 305 transmits the information viewing activity to the display content decision module 403 of the server 2 via the communication control module 304. Based on the received information viewing activity, the display content decision module 403 asks the document management module 402 for relevant information suitable for the viewing activity of the user and viewing environment/conditions, and then transmits, to the tablet computer 10, a document transmitted from the document management module 402. Then, the display processing module 305 (of the digital notebook application program 202 executed by the tablet computer 10) displays the document on the LCD 17A of the touchscreen display 17.

FIG. 7 is an exemplary schematic view showing a use case of the data processing system of the embodiment which uses the life log.

When the user creates a handwritten document using the tablet computer 10, it detects the handwriting input activity of the user. The tablet computer 10 transmits the handwritten document created by the user to the server 2, and also transmits, to the server 2, the life log indicating various activities of the user including the handwriting input activity. If the user performs a handwriting input operation on a given displayed reference (document) without limiting to the handwritten document, the tablet computer 10 also detects the handwriting input activity of the user, and transmits the life log to the server 2. By associating various documents including the handwritten document with the life log on the server 2, the data processing system of the embodiment achieves information sharing and presentation of relevant information using the life log. Although not shown in FIG. 7, the data processing system of the embodiment also achieve idea generation support using the life log.

(Presentation of Relevant Information Using Life Log)

Presentation of relevant information using life log will be described with reference to FIG. 8.

Assume that the user performs a document search by inputting a search key. Various data such as a keyword, date/time, and location can be used as a search key. Assume that "keyword A" is input (which is denoted by reference symbol a1 in FIG. 8).

The tablet computer 10 notifies the server 2 of this activity, and the server 2 finds, for example, documents (documents a2, a3, . . . in FIG. 8) containing "keyword A" by the search. The tablet computer 10 presents these found documents to the user.

Assume that the user selects one (document a3 in FIG. 8) of the presented documents, and performs an operation of searching for relevant documents. Assume also that when this document is displayed on the tablet computer 10, it is associated with stroke data as a life log since a handwriting input operation has been performed. Furthermore, assume that data have been written in other documents (documents a4 and a5 in FIG. 8) at a time relatively close to a time when the writing operation was performed for the document. Each of other documents, therefore, is associated with stroke data as a life log.

A group of documents for which a writing operation has been performed within a given period of time probably have some relevance. For example, the documents are used in the same work. Upon reception of the relevant document search activity from the tablet computer 10, the server 2 detects documents a4 and a5 from document a3 based on the time indicated by the stroke data. It is difficult to find documents a4 and a5 based on document a3 by a normal search operation.

Note that when document a3 is found using "keyword A", documents a4 and a5 may be further detected based on the stroke data associated with document a3, and then presented as a detection result together with document a3.

As described above, the data processing system of the embodiment achieves presentation of relevant information using the life log.

(Idea Generation Support Using Life Log)

Idea generation support using the life log will be described with reference to FIG. 9.

When the user performs a research by a database search on, for example, the Web, and collects information according to a given theme, he/she always organizes the information, and understands the research result to generate ideas. The data processing system of the embodiment supports organization of information and generation of ideas from the information.

"A" in FIG. 9 shows a state in which keywords in the researched information have been written down, and have been encircled. When a handwriting input activity of encircling the keyword is detected, the display processing module 305 or display content decision module 403 processes the encircled handwritten marks (the handwritten marks within the encircled range) as one object. If, for example, an operation (activity) of converting data into a mind map is detected, the display processing module 305 or display content decision module 403 converts, for each object, display into that in a different format such as a mind map shown in "B" of FIG. 9 by executing handwritten mark recognition processing, and changing the location of the object. As a method of converting the location of an object, any existing method is applicable. The data processing system of the embodiment can add a determination criterion for determining that objects for which times indicated by stroke data are close to each other have high relevance in deciding the location of each object.

Enabling the user to always view the same contents in a plurality of formats is considered to provide the effects of promoting idea generation or awareness creation. As described above, the data processing system of the embodiment achieves idea generation support using the life log.

(Information Sharing Using Life Log)

Information sharing using the life log will be described with reference to FIG. 10 and FIG. 11.

In a group effort for a creative work in a business situation, jobs such as sharing and merging of tasks, review, and adjustment based on the review are required. To support the group effort, the data processing system of the embodiment provides an information sharing function (including a data merge function) of increasing the efficiency of a review meeting and a job for using feedback obtained in the meeting for adjustment.

FIG. 10 shows an operation example of the data processing system in which all participants in a review meeting share the reference (document) of a speaker on the spot, data written in the reference of each participant are immediately reflected, and feedback given by the participants in the meeting is merged after the meeting, thereby enabling the speaker to immediately start an adjustment job. User A as a speaker, and users B and C who listen to the presentation of user A in a remote location are writing data in a reference α. In addition to writing data in the document while it is displayed on the tablet computer 10, it is also possible to write data in the document on the tablet computer 10 of each user while the document is displayed on a display device available in the meeting, as shown in FIG. 10.

If data is written in the document on the tablet computer 10, stroke data is associated with the document as a life log. If a plurality of users write data in one document, the server 2 manages stroke data for each user.

Figure 11:
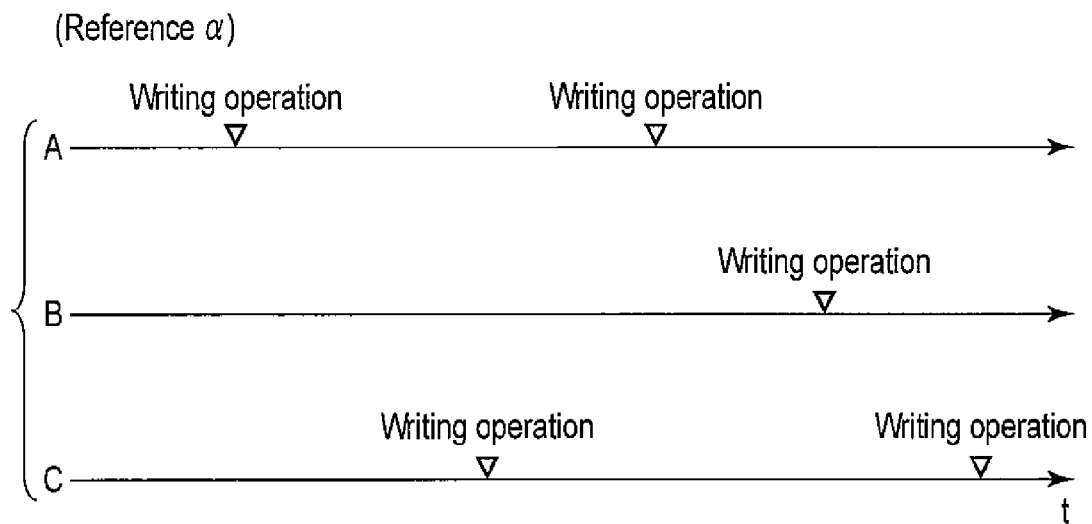
FIG. 11 is an exemplary second view for explaining information sharing using the life log, which is achieved by the data processing system according to the embodiment.

Assume that three users A, B, and C write data in the reference α as shown in FIG. 11. Since the reference α is associated with the stroke data of each user A, B, or C, it is possible to perform an adjustment job such as a job of selecting a user and viewing the reference α on which the data written by the selected user is superimposed, or a job of viewing the reference α while superimposing only data written by the selected user on the reference α in a time serial manner. As described above, the data processing system of the embodiment achieves information sharing using the life log.

Figure 12:
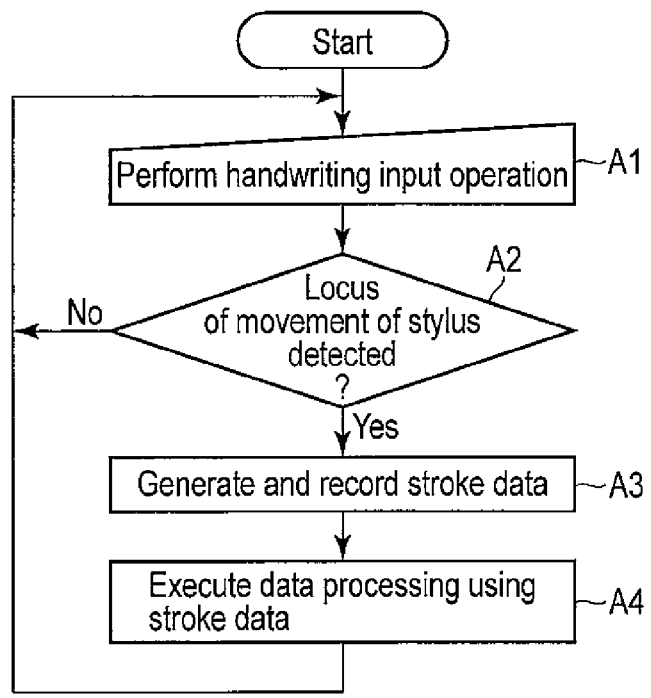
FIG. 12 is an exemplary flowchart showing the operation procedure of the data processing system according to the embodiment.

FIG. 12 is an exemplary flowchart showing the operation procedure of the data processing system of the embodiment.

If a handwriting input operation is performed (block A1), the handwriting signal input module 301 receives a detection signal, and the daily activity detection module 302 detects the locus of movement of a pen (YES in block A2). The daily activity detection module 302 generates stroke data based on the detection signal, and the daily activity recording module 303 records the generated stroke data in the life log management module 401 as a life log (block A3).

Then, the display processing module 305, document management module 402, or display content decision module 403 executes data processing using the stroke data (block A4).

Since the operation control processing of the embodiment can be implemented by software (a program), it is possible to readily obtain the same effects as those in each embodiment by installing, into a general computer, the software through a computer-readable storage medium having the software stored, and executing the software.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system comprising:
    a recorder to record a plurality of stroke data comprising information concerning loci handwritten on a screen and information concerning a time when loci are handwritten on the screen, the stroke data being associated with document files which are displayed on the screen when loci are handwritten on the screen; and a processing circuitry to execute data processing for associating a first document file and a second document file using both a first time comprised in first stroke data associated with the first document file and a second time comprised in second stroke data associated with the second document file, wherein loci of the first stroke data are handwritten on the first document displayed on the screen at the first time, and loci of the second stroke data are handwritten on the second document displayed on the screen at the second time, wherein the first document and second document are linked based on the recorded time of each stroke data of the loci.

2. The system of claim 1, wherein the processing circuitry executes:
displaying first loci indicated by the plurality of stroke data on the screen;
recognizing either a character or a graphic represented by loci indicated by the plurality of stroke data; and
displaying second loci indicated by the plurality of stroke data on the screen in a format different from a format of the first loci, by using a recognition result by the recognizing and the times indicated by the stroke data.

3. The system of claim 2, wherein the displaying the second loci comprises processing, if the recognizing recognizes a graphic for designating a region, a character string recognized by the recognizing and included in the region designated by the graphic as one object, and executing data processing to loci indicated by the plurality of stroke data in units of object.

4. The system of claim 1, wherein:
the recorder records the plurality of stroke data for each user; and
the processing circuitry executes superimposing loci indicated by the plurality of stroke data recorded for each user, by using the times indicated by the plurality of stroke data.

5. The system of claim 4, wherein:
the recorder records the plurality of stroke data in association with data displayed on the screen when a handwriting operation is performed on the screen; and
the processing circuitry executes combining loci indicated by the plurality of stroke data superimposed by the superimposing with the data associated with the plurality of stroke data, and displaying the obtained data on the screen.

6. The system of claim 4, wherein the superimposing comprises superimposing loci indicated by the plurality of stroke data in a time serial manner.

7. The system of claim 4, wherein the superimposing comprises accepting user designation, and superimposing loci of the designated user.

8. A data processing method for a system, the method comprising:
recording a plurality of stroke data comprising information concerning loci handwritten on a screen and information concerning a time when loci are handwritten on the screen, the stroke data being associated with document files which are displayed on the screen when loci are handwritten on the screen; and
executing data processing for associating a first document file and a second document file using both a first time comprised in first stroke data associated with the first document file and a second time comprised in second stroke data associated with the second document file, wherein loci of the first stroke data are handwritten on the first document displayed on the screen at the first time, and loci of the second stroke data are handwritten on the second document displayed on the screen at the second time, wherein the first document and second document are linked based on the recorded time of each stroke data of the loci.

9. A computer-readable, non-transitory storage medium having stored thereon a computer program which is executable by a computer, the computer program controlling the computer to function as:
a recorder to record a plurality of stroke data comprising information concerning loci handwritten on a screen and information concerning a time when loci are handwritten on the screen, the stroke data being associated with document files which are displayed on the screen when loci are handwritten on the screen; and
a processing circuitry to execute data processing for associating a first document file and a second document file using both a first time comprised in first stroke data associated with the first document file and a second time comprised in second stroke data associated with the second document file, wherein loci of the first stroke data are handwritten on the first document displayed on the screen at the first time, and loci of the second stroke data are handwritten on the second document displayed on the screen at the second time, wherein the first document and second document are linked based on the recorded time of each stroke data of the loci.

10. The method of claim 8, wherein the executing comprises:
displaying first loci indicated by the plurality of stroke data on the screen;
recognizing either a character or graphic represented by loci indicated by the plurality of stroke data; and
displaying second loci indicated by the plurality of stroke data on the screen in a format different from a format of the first display module, by using a recognition result by the recognizing and the times indicated by the stroke data.

11. The method of claim 10, wherein the displaying the second loci comprises processing, if the recognizing recognizes a graphic for designating a region, a character string recognized by the recognizing and included in the region designated by the graphic as one object, and executing data processing to loci indicated by the plurality of stroke data in units of object.

12. The method of claim 8, wherein:
the recording comprises recording the plurality of stroke data for each user; and
the executing comprises superimposing loci indicated by the plurality of stroke data recorded for each user, by using the times indicated by the plurality of stroke data.

13. The method of claim 12, wherein:
the recording comprises recording the plurality of stroke data in association with data displayed on the screen when a handwriting operation is performed on the screen; and
the executing comprises combining loci indicated by the plurality of stroke data superimposed by the superimposing with the data associated with the plurality of stroke data, and to display the obtained data on the screen.

14. The method of claim 12, wherein the superimposing comprises superimposing loci indicated by the plurality of stroke data in a time serial manner.

15. The method of claim 12, wherein the superimposing comprises accepting user designation, and superimposing loci of the designated user.

16. The medium of claim 9, the processing circuitry to execute:
displaying first loci indicated by the plurality of stroke data on the screen;
recognizing either a character or graphic represented by loci indicated by the plurality of stroke data; and
displaying second loci indicated by the plurality of stroke data on the screen in a format different from a format of the first loci, by using a recognition result by the recognizing and the times indicated by the stroke data.

17. The medium of claim 16, wherein the displaying the second loci comprises processing, if the recognizing recognizes a graphic for designating a region, a character string recognized by the recognizing and included in the region designated by the graphic as one object, and executing data processing to loci indicated by the plurality of stroke data in units of object.

18. The medium of claim 17, the recorder to record the plurality of stroke data for each user; and
the processing circuitry to execute superimposing loci indicated by the plurality of stroke data recorded for each user, by using the times indicated by the plurality of stroke data.

19. The medium of claim 18, the recorder to record the plurality of stroke data in association with data displayed on the screen when a handwriting operation is performed on the screen; and
the processing circuitry to execute combining loci indicated by the plurality of stroke data superimposed by the superimposing with the data associated with the plurality of stroke data, and to display the obtained data on the screen.

20. The medium of claim 19, wherein the superimposing comprises superimposing loci indicated by the plurality of stroke data in a time serial manner.

21. The medium of claim 19, wherein the superimposing comprises accepting user designation, and superimposing loci of the designated user.

* * * * *